Figure 6:
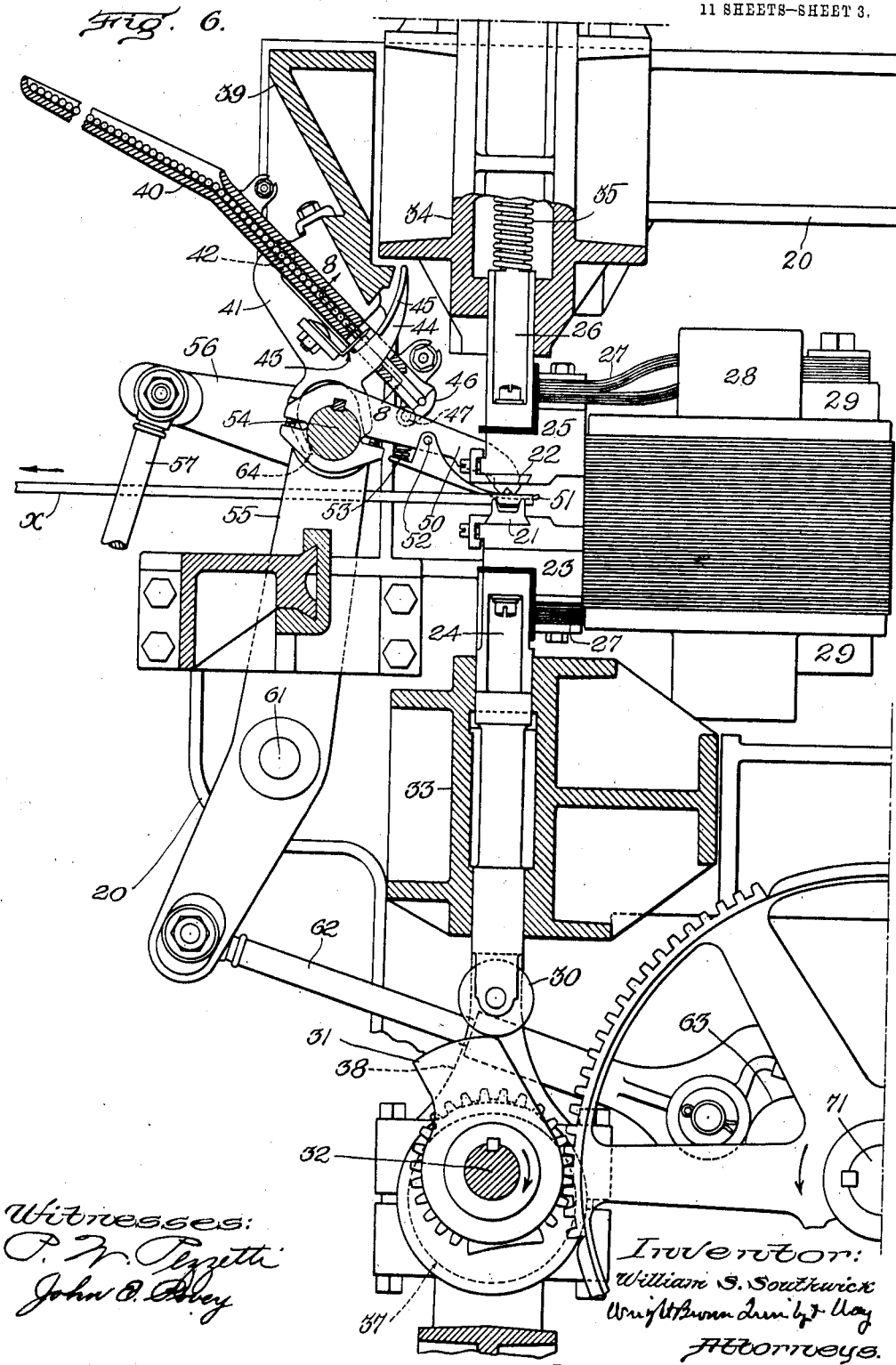

W. S. SOUTHWICK.
MACHINE FOR WELDING REINFORCEMENTS FOR CONCRETE.
APPLICATION FILED OCT. 26, 1911.
1,093,297.
Patented Apr. 14, 1914.
11 SHEETS—SHEET 1.
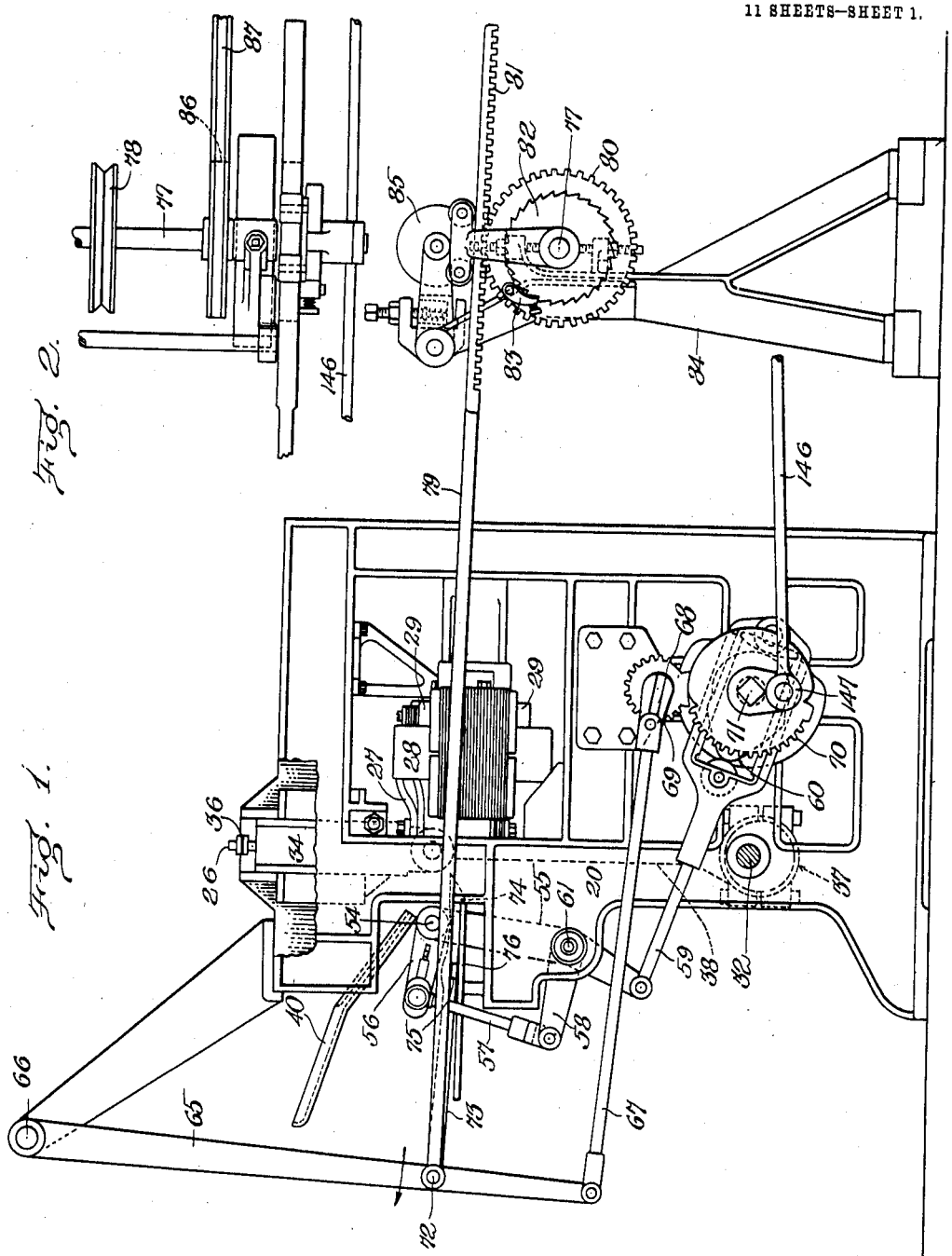

W. S. SOUTHWICK.
MACHINE FOR WELDING REINFORCEMENTS FOR CONCRETE.
APPLICATION FILED OCT. 26, 1911.
1,093,297.
Patented Apr. 14, 1914.
11 SHEETS—SHEET 2.
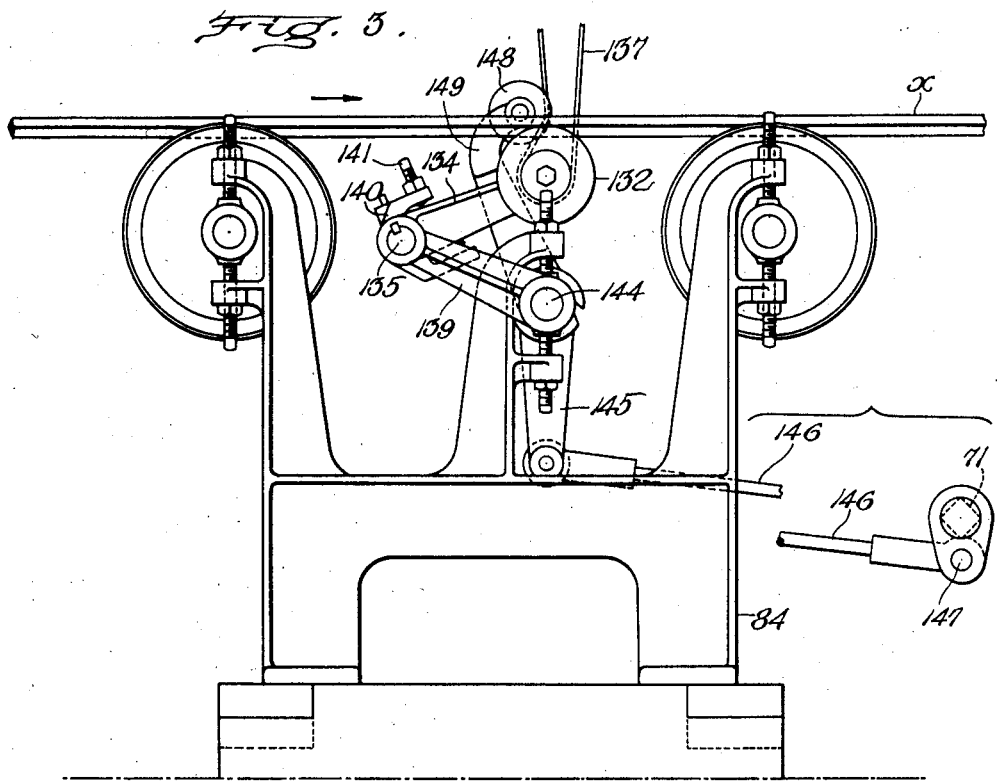
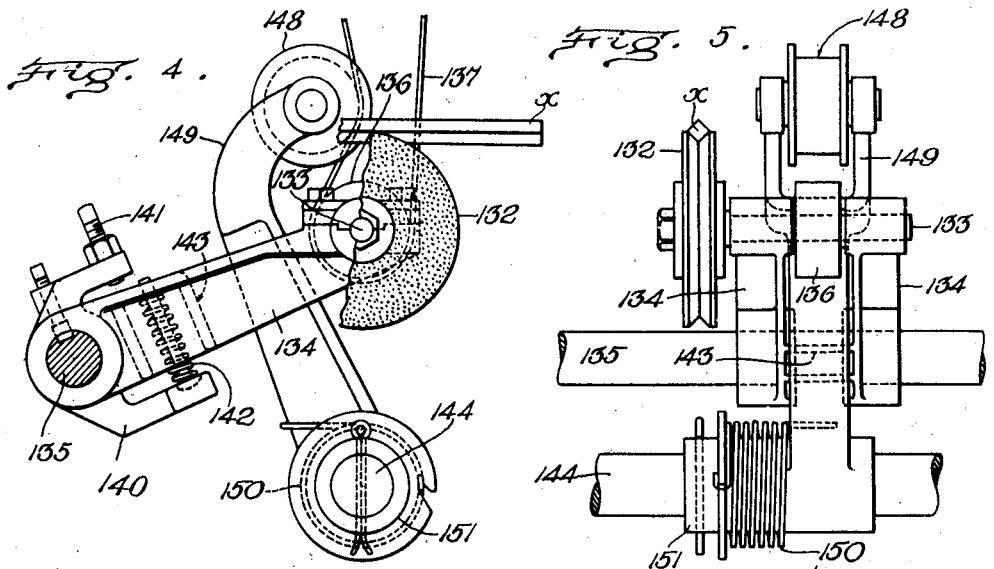
Witnesses:
Inventor:
William S. Southwick,
by Wright Brown Quinby & May
Attorneys.

W. S. SOUTHWICK.
MACHINE FOR WELDING REINFORCEMENTS FOR CONCRETE.
APPLICATION FILED OCT. 26, 1911.

1,093,297.

Patented Apr. 14, 1914.
11 SHEETS—SHEET 3.

Witnesses:
Inventor:
William S. Southwick
Attorneys.

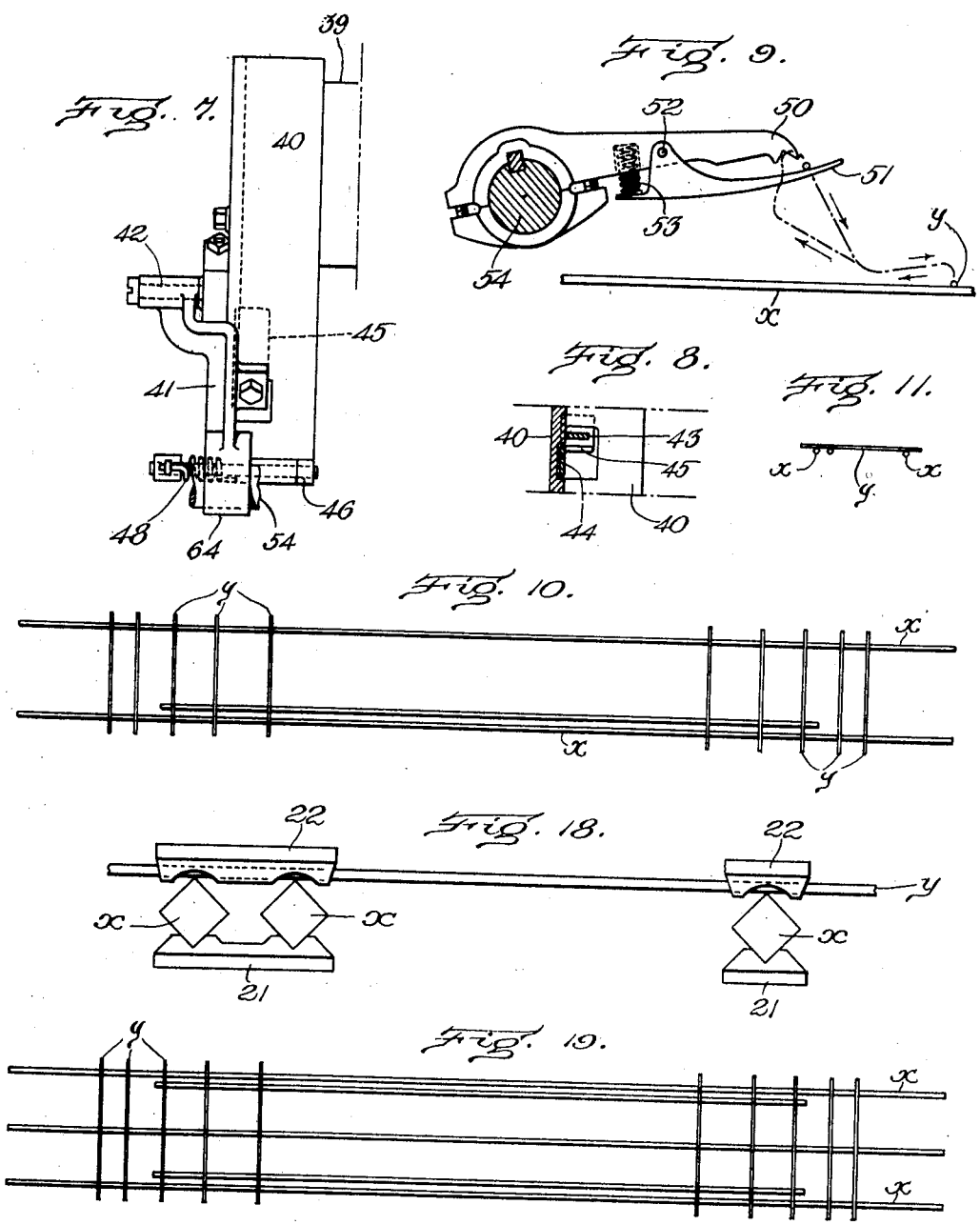

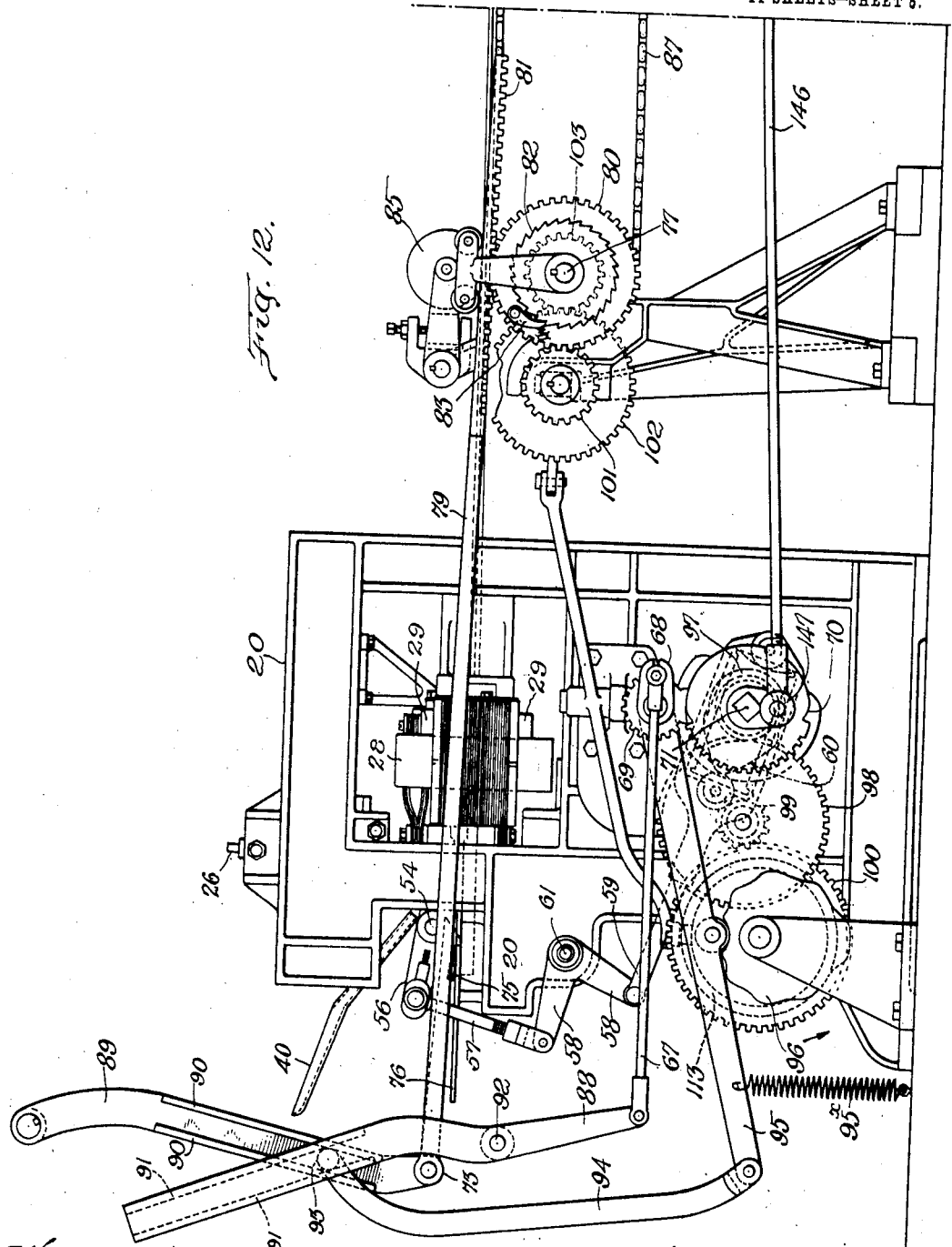

W. S. SOUTHWICK.
MACHINE FOR WELDING REINFORCEMENTS FOR CONCRETE.
APPLICATION FILED OCT. 26, 1911.
1,093,297.
Patented Apr. 14, 1914.
11 SHEETS—SHEET 6.
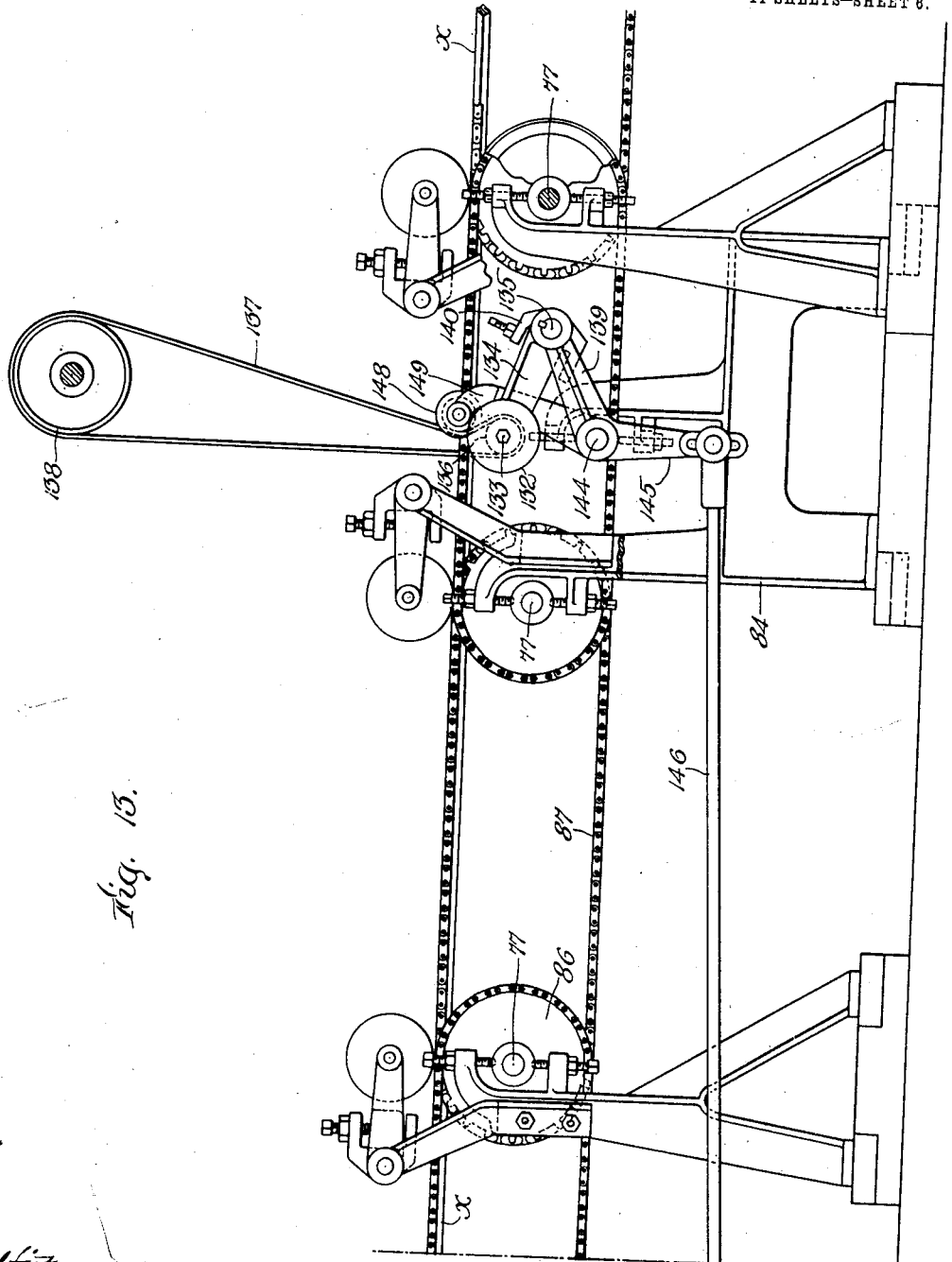

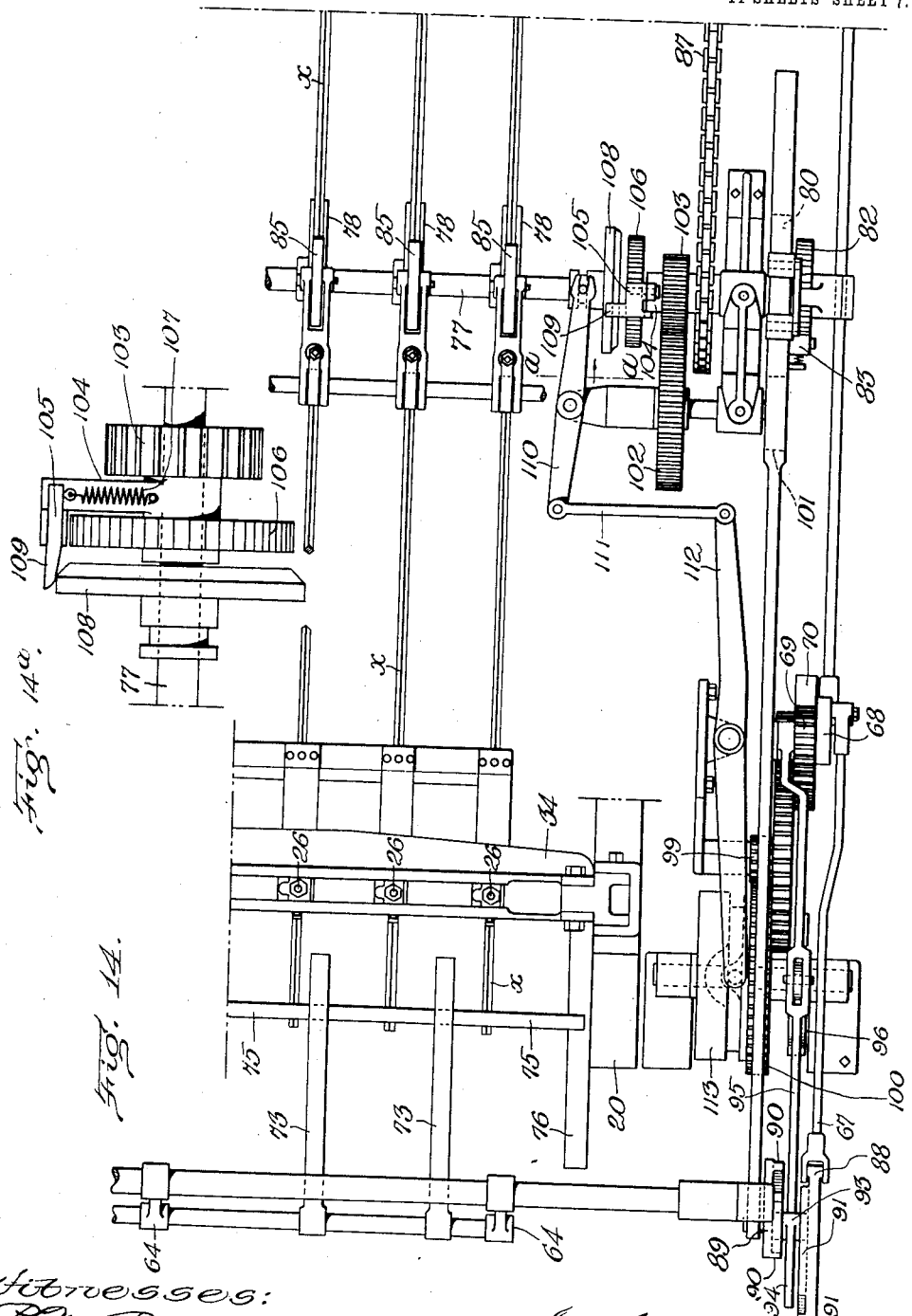

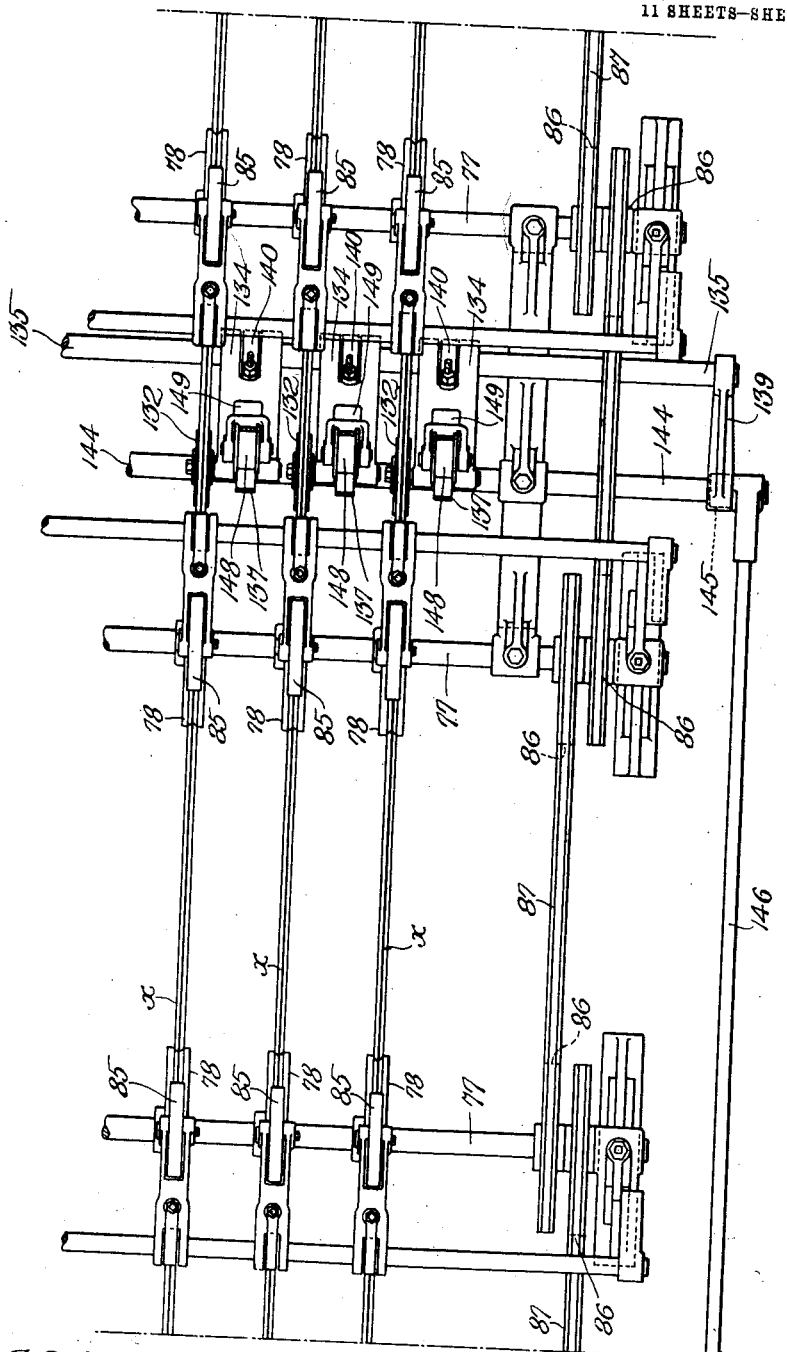

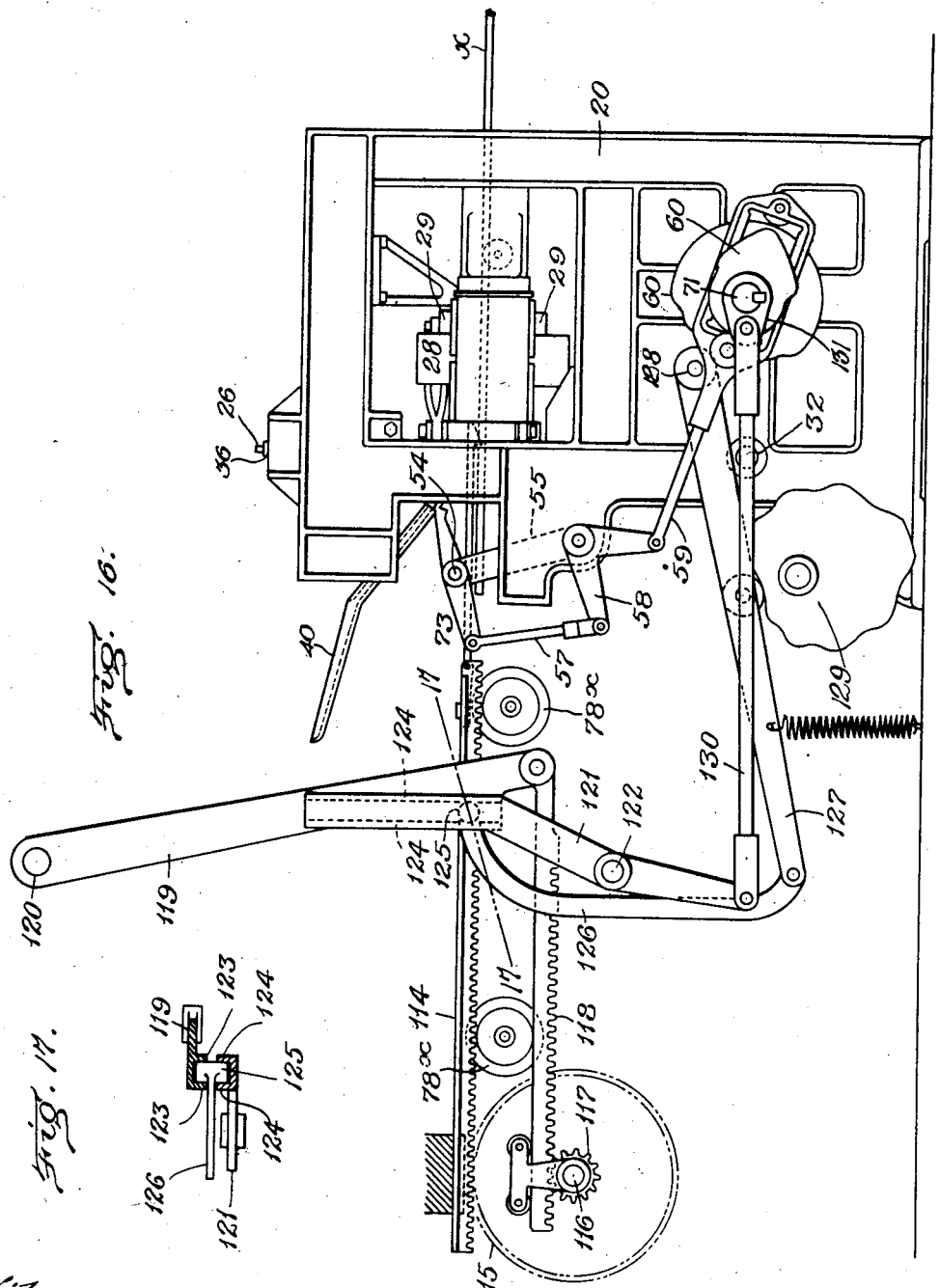

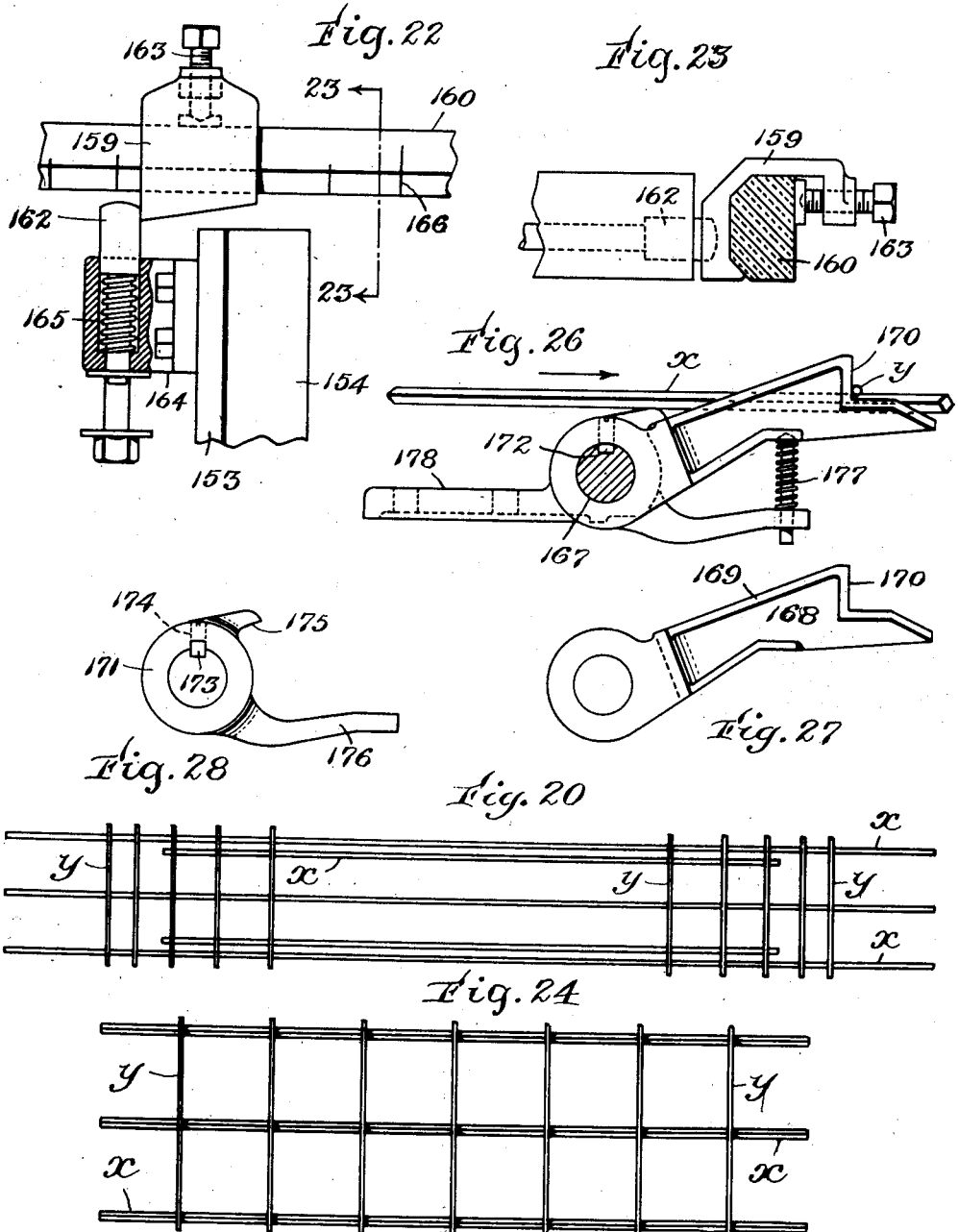

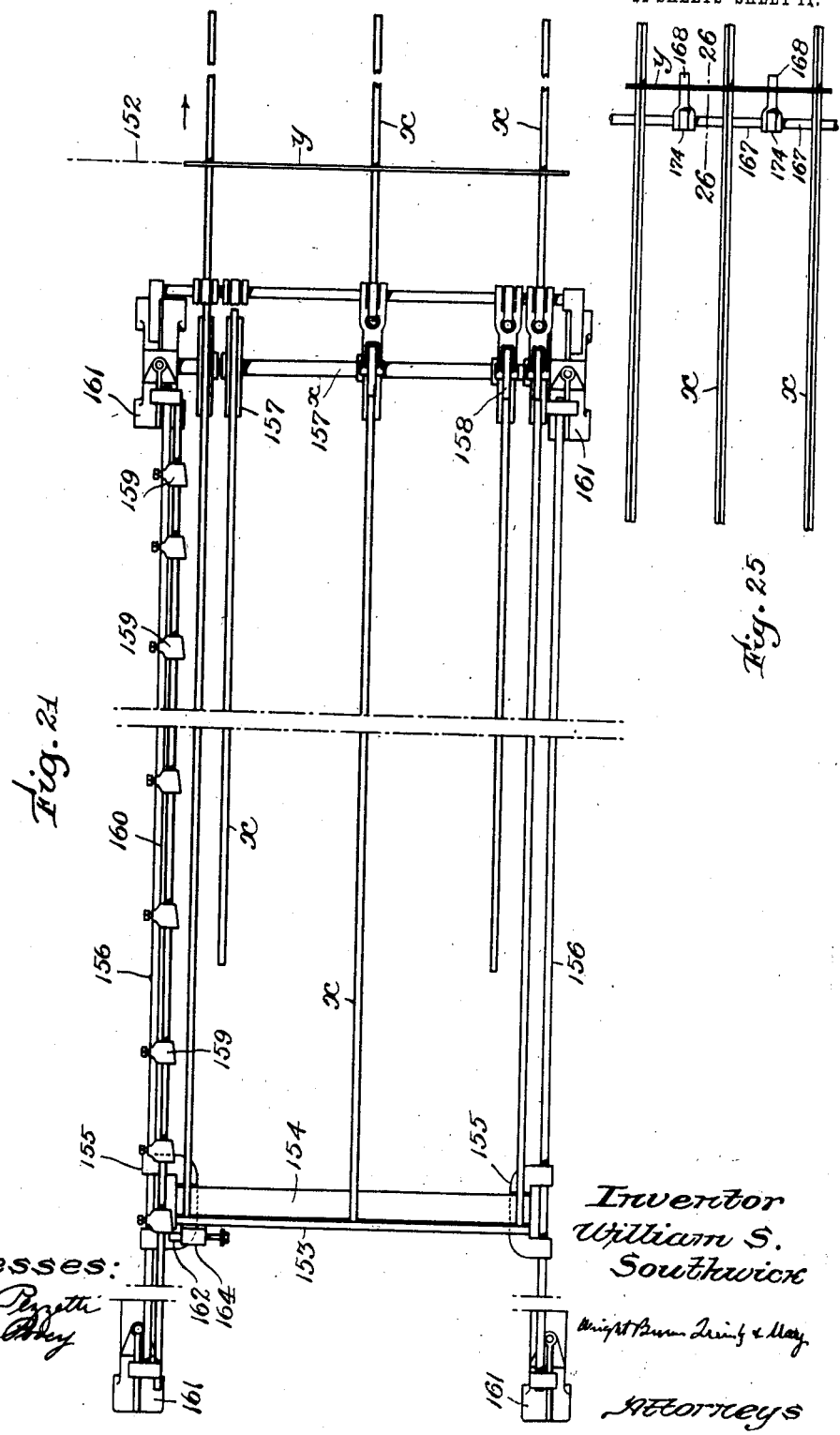

UNITED STATES PATENT OFFICE.

WILLIAM S. SOUTHWICK, OF CLINTON, MASSACHUSETTS, ASSIGNOR TO CLINTON WIRE CLOTH COMPANY, OF CLINTON, MASSACHUSETTS, A CORPORATION OF MASSACHUSETTS.

MACHINE FOR WELDING REINFORCEMENTS FOR CONCRETE.

1,093,297.  Specification of Letters Patent.  Patented Apr. 14, 1914.

Application filed October 26, 1911. Serial No. 656,984.

*To all whom it may concern:*

Be it known that I, WILLIAM S. SOUTHWICK, of Clinton, in the county of Worcester and State of Massachusetts, have invented certain new and useful Improvements in Machines for Welding Reinforcements for Concrete, of which the following is a specification.

This invention relates to electric welding machines.

The purpose to which the invention is especially adapted is the welding of bars, rods or wires to be used to reinforce concrete in building construction. Reinforcing structure for this purpose requires a peculiar arrangement of tension rods and means for holding them in position while the concrete is being molded about them.

The reinforcing structure produced by the mechanism of the present invention comprises tension rods and stay rods or wires of relatively small cross-section arranged transversely with relation to the tension rods and united therewith by a welding process. The tension rods become substantially fixed one with relation to another as the result of the connecting stay wires thus welded, so that the tension rods cannot become displaced with relation to each other during the operation of placing the concrete about them or tamping the concrete in a compact mass. In the construction of a composite concrete beam, the appropriate location of the tension rods is near the upper surface of the beam at the ends thereof and near the lower surface of the beam throughout a considerable distance midway between the ends. Tension rods are not required near the bottom surface of the beam at the ends or near the upper surface of the beam midway between the ends, because the tension upon the beam when sustaining a load does not exist at these points but only at the points where the tension rods are located as set forth by the preceding statement. The stay wires should be relatively close one to another at the ends of the beam, but for economical construction the space between them should be gradually increased upon approaching the middle portion.

The machine illustrated by the accompanying drawings comprises a plurality of welding units adapted to weld the stay wires to the tension rods by means of an electric current.

The machine also includes automatic means for feeding the tension rods step by step and for placing the stay wires against the tension rods in position to be grasped by the electrodes which perform the welding operation. One feeding mechanism for the tension rods is adapted to impart a differential feeding movement, to the end that the stay wires will be attached at varying intervals instead of being attached at equal intervals. For example, the tension rods are given a series of relatively short steps while the welding mechanism is operating to attach the stay wires near one end of the beam, after which the feeding mechanism imparts steps of greater length and thereafter imparts steps of less length so as to space the stay rods in the manner explained. In other words, the feeding mechanism is adapted to impart first feeding steps of increasing length and then steps of decreasing length.

The invention includes means for grinding the surfaces of the tension rods at the points where the electrodes are to be closed upon them. The grinding operation is made necessary by the presence of a scale upon the tension rods, which scale is the result of the process of manufacturing the rods. If the tension rods were covered by such scale at the points where they are engaged by the welding electrodes, a satisfactory electrical contact with the electrodes would be prevented. This would not only impede the passage of the welding current, but would result in sparking and destruction of the electrodes in a relatively short time. But when the scale is removed from the tension rods at the points where the electrodes engage the rods, the welding operation may be performed in a satisfactory manner. The grinding devices for removing the scale are arranged at a predetermined distance from the point where the welding operation is performed. For example, when welding units in which the stay wires are unequally spaced, the grinding devices are positioned at a distance from the welding electrodes equal to the length of one unit, with this result: While a stay wire is being welded to the tension rods of one unit, the grinding devices are operating upon the tension rods of the succeeding unit at the same relative point along the length of the unit as that where the stay wire is being welded to the preceding unit. The feeding mechanism is extended for a distance as great as or greater than the length of the unit, so that a series of units may be fed in end to end relation, with the tension rods of one unit abutting against those of the next. This form of feeding mechanism, the simultaneous operations of the welding mechanism and grinding mechanism, and the location of the grinding mechanism with relation to the welding mechanism, are the three controlling factors which make it possible to grind the tension rods at unequal intervals and to weld the stay wires thereto at the points ground.

There are some classes of work of this character in which uniform spacing of the stay wires is desirable. An example of such work is structure for reinforcing flooring. In producing flooring structure uniform feed mechanism may be substituted for the differential feed mechanism, and the grinding devices may be placed relatively close to the welding mechanism. For example, if the stay wires are to be attached at intervals of three feet, the grinding devices may be placed at a distance of three feet in advance of the welding mechanism, or at any other point which would be a multiple of such distance. An arrangement of this kind is shown by the accompanying drawings which illustrate uniform feed mechanism.

The present invention comprises also a magazine for holding a number of stay wires, automatic means for feeding the stay wires one by one to the lower end of the magazine, and means for transferring the stay wires from the magazine to the electrodes in position to be welded to the tension rods. The welding mechanism and the stay-wire-placing mechanism is substantially the same as that illustrated and described in U. S. Letters Patent No. 830,018, granted H. L. Smith, September 4, 1906. One difference which may be noted is that the machine shown in that patent is arranged to operate upon strand wires fed vertically, the welding electrodes having a horizontal movement for gripping the strand wires and stay wires, whereas according to the present invention the tension rods which are analogous to strand wires are fed horizontally and the welding electrodes have vertical movement for gripping the stay wires and tension rods. The stay-wire-placing mechanism of the present invention is correspondingly shifted so as to remain in the same position with relation to the welding mechanism and the direction of feed.

Of the accompanying drawings which illustrate the present invention: Figure 1 represents a left-side elevation of a welding machine provided with feeding mechanism adapted to impart feeding steps of equal length. Fig. 2 represents a top plan view of a portion of the feeding mechanism shown by Fig. 1. Fig. 3 represents a right-side elevation of grinding mechanism. Fig. 4 represents, on a larger scale, a similar elevation of a portion of the grinding mechanism. Fig. 5 represents a rear elevation of the mechanism shown by Fig. 4. Fig. 6 represents a vertical section of the welding mechanism, stay-wire magazine, stay-wire-feed mechanism, and stay-wire-placing mechanism. This mechanism is viewed in the same direction as Fig. 1. Fig. 7 represents a rear elevation of a portion of the stay-wire magazine. Fig. 8 represents a section through the stay-wire feed mechanism on a plane indicated in Fig. 6 by line 8—8. Fig. 9 represents an elevation of one of the stay-wire-placing devices. Fig. 10 represents a top plan view of the longitudinal rods and transverse stay members welded together. Fig. 11 represents an end elevation of the article shown by Fig. 10. Fig. 12 represents a side elevation of a welding machine similar to Fig. 1 but having differential feed mechanism whereby the feeding steps are automatically varied. Fig. 13 represents a side elevation of feeding mechanism and grinding mechanism, the feeding mechanism being an extension of that shown at the right of Fig. 12. If Fig. 13 be placed at the right of Fig. 12, the relation of the two portions of the mechanism will be illustrated. Fig. 14 represents a top plan view of the feed mechanism shown by Fig. 12. Fig. 14$^a$ represents ratchet and pawl mechanism on a plane indicated by line $a$—$a$ of Fig. 14. Fig. 15 represents a top plan view of the mechanism shown by Fig. 13. Fig. 16 represents a side elevation of welding mechanism and feed mechanism adapted to impart feeding steps of unequal length. The mechanisms shown by this figure differ from the corresponding mechanisms of Fig. 12 in that the mutilated gearing is omitted and the feed mechanism is otherwise driven so as to operate without interruption. Fig. 17 represents a section of the mechanism indicated by line 17—17 of Fig. 16. Fig. 18 represents an elevation of two pairs of welding jaws in the act of gripping longitudinal rods and a transverse stay member. Fig. 19 represents a top plan view of a reinforcing unit differing from that shown by Fig. 10. Fig. 20 represents a top plan view of a reinforcing unit having longitudinal rods of unequal length and transverse stay members unequally spaced. Fig. 21 represents a top plan view of manually operative feeding mechanism for a unit such as that shown by Fig. 20. Fig. 22 shows, on a larger scale, a portion of the structure included in Fig. 21.

Fig. 23 represents a vertical cross section as indicated by line 23—23 in Fig. 22. Fig. 24 represents a top plan view of a reinforcing unit in which the stay members are equally spaced. Fig. 25 represents a top plan view of means for determining feeding steps of uniform length for producing the article shown by Fig. 24. Fig. 26 represents, on a larger scale, a portion of the feed regulating mechanism, the view being a section indicated by line 26—26 in Fig. 25. Fig. 27 represents a side elevation of a stop member included in Fig. 26. Fig. 28 represents a side elevation of another member included in Fig. 26.

The same reference characters indicate the same parts wherever they occur.

Referring first to the product of the machine as shown by Figs. 10 and 19, the longitudinal tension rods are indicated at $x$, and the stay wires therefor are indicated at $y$. The rods $x$ are square in cross section and are arranged and held in such position as to present their angles or edges for engagement with the stay wires $y$. The cross section of the stay wires is shown to be round, but metallic members of any desired cross section may be used to connect the rods $x$. So far as the welding operation is concerned, the size of the rods $x$ is immaterial, because while the angle of their cross section remains square and while they are arranged and held in position as shown the cross-sectional area which becomes welded to the transverse members does not vary with variation in size only of the rods $x$.

By way of differentiating between the operations as performed by the machine hereinafter described and the operations of the machine set forth in the aforesaid Patent No. 830,018, it should be remembered that in the present instance the longitudinal members $x$ are straight and too stiff to permit winding upon a drum, whereas the longitudinal members as shown in said patent are relatively thin and flexible and are intended to be fed into the machine from coils and to be wound upon a drum after being welded. For this reason the several mechanisms hereinafter described are arranged so as to operate upon the longitudinal members arranged horizontally, since a horizontal arrangement is the most convenient arrangement in handling work of this character.

The desired number of longitudinal rods $x$ are arranged side by side in a horizontal plane at the desired distance one from another, and in this relation they are fed in unison step by step between the side frame members 20 of the welding mechanism. The electrodes of the welding mechanism are illustrated in Fig. 6 and are indicated at 21 and 22. It is impossible to illustrate more than one pair of electrodes and one complete welding unit in a view such as Fig. 6, but it will be understood that the welding mechanism is provided with a number of welding units such as that shown by this figure, the welding units being arranged in a series and appropriately spaced. The construction of the welding mechanism and the mode of operation are substantially the same as set forth in said Letters Patent No. 830,018.

A brief description of the mechanism shown by Fig. 6 will be sufficient to make the operation of the present machine understood. The electrode 21 which in this instance is the lower electrode, is affixed to an electric conductor 23 mounted upon but insulated from a plunger 24. The upper electrode 22 is mounted upon a conductor 25 which is likewise mounted upon but insulated from a plunger indicated at 26. The conductors 23 and 25 are connected by flexible conductors 27 with bus bars 29 whose ends are connected to transformers 28. The current for the transformers is controlled by automatic switch mechanism. (Not shown.) The lower plunger 24 is provided with a roll 30 which coöperates with a cam 31 on a driven shaft 32. The cam moves the electrode 21 and permits opposite movement of the electrode at the time for feeding the rods $x$. Suitable bearings for the plunger 24 and for the other plungers of the series are afforded by a horizontal girt 33 which connects the two side frame members 20. The upper plunger 26 and similar plungers in the series are mounted in bearings afforded by a transverse horizontal beam or girt 34. The upper ends of the plungers 26 are surrounded by compression springs 35 which exert their tension downwardly upon the shoulders of the plungers, as shown by Fig. 6. The plungers are provided with stop nuts or collars 36 which strike against the girt 34 to limit relative movement of the plungers. The girt 34 is moved toward and from the work by eccentrics such as that indicated at 37 on the shaft 32. The ends of the girt 34 are arranged to slide in suitable bearings in the side frame members 20 and are connected with the eccentrics 37 by eccentric rods 38.

Suitable mechanism is provided for placing the stay members $y$ in position upon the longitudinal rods $x$ at the point where the welding jaws are brought together. A magazine is provided for containing a number of stay members, and feeding mechanism is provided for effecting the discharge of the stay members one by one to the lower end of the magazine so that each stay member after it is discharged may be transferred to the welding jaws. The magazine and transferring mechanism are shown best by Fig. 6. Adjustably attached to a transverse horizontal girt 39 are two inclined guides 40 in which the ends of the stay members are arranged. The distance between the guides 40 may be varied to meet the requirements of stay members of one length or another. The stay members gravitate in the guides and are released one by one by a pair of reciprocatory members such as that indicated at 41. The members 41 are mounted upon pivot studs 42 and are provided with stop members 43 which are moved to and from the path of the stay members in the guides so as to alternately intercept and release the stay members. The oscillatory releasing members 41 are provided with fingers 44 having lips 45 which extend laterally and which are adapted to intercept and release the stay members. The relation of the stops 43 and lips 45 is such as to permit the stay members to descend from one to the other when the oscillatory members 41 are moved in one direction and to release the lower stay member and intercept the next succeeding stay member when the oscillatory members are moved in the opposite direction. Each stay member as it is released gravitates to the lower end of the guides 40, where it is held by yielding gates 46, one on each guide. The gates are arranged upon pivots 47 and are normally closed by springs 48. (See Fig. 7.) Each stay member upon arriving at the lower end of the guides 40 is grasped by a pair of transferring devices such as that shown by Fig. 9. Each transferring device comprises a positively-actuated finger 50 and a yielding finger 51. The finger 51 is pivotally connected to the finger 50 at 52 and is normally closed by a spring 53. The finger 50 is affixed upon a rock shaft 54 but may be adjusted along the length of the rock shaft so that it may be positioned according to the length of the stay members. The outer end of the finger 50 is notched as shown, for the purpose of receiving the stay member. The rock shaft 54 is oscillated and is moved laterally in such manner as to cause the stay member in the notch of the finger 50 to traverse a path such as that indicated by the broken line in Fig. 9. For this purpose the rock shaft 54 is mounted in bearings in two oscillatory arms 55 from which it receives its lateral motion. Oscillatory motion is imparted to the rock shaft by an arm 56 connecting rod 57, bell-crank lever 58, cam rod 59, and cams 60 on the shaft 71. The arms 55 are pivoted at 61 and are operated by rods 62 and cams 63 on the shaft 71. (See Fig. 6.) The oscillatory feeding devices 41 are connected to the rock shaft 54 so as to be operated as the result of the lateral movement of the shaft. For this purpose the feeding devices 41 are formed with fingers 64 which straddle the rock shaft as shown by Fig. 6. While the transferring fingers are moving from the welding jaws toward the magazine, the feeding devices 41 are operated to permit a slight downward movement of the stay members in the magazine, and while the transferring fingers are carrying a stay member from the magazine to the welding jaws, the feeding devices 41 are operated to release the lowest stay member so that it may descend to the yielding gates 46 in position to be grasped by the transferring fingers on their return.

The longitudinal rods $x$ to which a stay member has been welded are fed forward by means of the welded stay member. Other feeding mechanism is provided for feeding approaching rods $x$ to which stay members have not been welded. The feeding mechanism first mentioned, as shown by Fig. 1, is adapted to impart feeding steps of equal length. Other feeding mechanism hereinafter described is adapted to impart feeding steps of varying length.

Referring to the mechanism shown by Fig. 1, there are two feeding levers such as that indicated at 65. These feed levers are located one at either side of the machine in transverse alinement with each other, and because of their arrangement one is concealed by the other. The feed levers are affixed upon a rock shaft 66 from which they depend. The lower end of one lever is operated by a connecting rod, as indicated at 67. The connecting rod is operated by a crank 68 which, according to the mechanism illustrated in Fig. 1 receives intermittent motion. The crank 68 is affixed with relation to a mutilated gear 69 driven by a complemental mutilated gear 70. The gear 70 is affixed upon a driven shaft 71. The formation of the gears 69 and 70 is such that the crank is given a complete revolution while the shaft 71 is turning through 180 degrees of a revolution. During the remaining 180 degrees of the shaft 71, the crank 68 remains stationary. The purpose of operating the feed levers intermittently is to give sufficient time for the welding mechanism to perform an efficient welding operation. The feed levers 65 are connected by a transverse rod 72 upon which two or more pawls 73 are pivoted. The pawls may be shifted laterally to the positions required by the width of the work. The free ends of the pawls 73 are provided with shoulders 74 which are adapted to become hooked over a welded stay member and thereby advance the work when the feed levers are moved in the direction of the arrow. The pawls are so formed as to ride over the stay members when returning preparatory to a feeding movement. The pawls are connected by a transverse bar 75 whose ends have sliding bearing upon horizontal guides 76. By this means the free ends of the pawls are held in the plane of the stay members except when they are lifted in passing over one of the stay members. The approaching rods $x$ to which no stay member has been welded are, of course, not fed by the pawls 73. A portion of the feed mechanism for these rods is shown at the right of Fig. 1. A series of transverse shafts are arranged in advance of the welding mechanism and are provided with feed rolls upon which rest the approaching rods $x$. One of such shafts is indicated in Figs. 1 and 2 at 77. Any required number of shafts 77 may be provided, depending upon the length of the rods $x$. The shaft nearest the welding mechanism is rotated intermittently by one of the feed levers 65, and the remaining shafts 77 are driven by suitable driving connections such as sprockets and chains so that they will all operate in unison. The series of feed shafts and driving connections therefor are substantially the same as those illustrated in Figs. 12 and 13. The feed rolls 78 are grooved as shown by Fig. 2, for the purpose of positioning the rods $x$ so that the edges or angles of the rods will be in position to be engaged by the stay members $y$. The feed rolls are all keyed or otherwise affixed to their respective shafts, 77, but they may be moved on their shafts transversely of the direction of feed to appropriate positions. The driving connection between the feed lever 65 and the nearest shaft 77 comprises a connecting rod 79, a gear 80 loosely mounted upon the shaft, rack teeth 81 on the connecting rod and engaging the gear 80, a ratchet wheel 82 affixed to the shaft, and a spring-actuated pawl 83 mounted upon the gear so as to engage the ratchet wheel. The bearings for the shaft 77 are supported by suitable frames 84 which are preferably detached from the frames 20 so that the shaft may be placed at any desired distance from the welding jaws, depending upon the spacing of the transverse stay members. Pressure rolls 85 are provided for engaging the upper edges of the rods $x$ to keep them seated in their feed rolls 78. A sprocket wheel 86 is affixed upon the shaft 77 and drives a chain 87 extending to a similar sprocket on the next shaft 77. Throughout the series of shafts 77 similar driving connection is made by other sprockets 86 and chains 87.

As previously stated, the feed mechanism shown by Fig. 1 is adapted to impart feeding steps of equal length. The feed mechanism shown by Figs. 12 to 15 is adapted to impart feeding steps of unequal length. The welding mechanism shown by Fig. 12 is the same as that hereinbefore described. The feed mechanism in Fig. 12 is driven, as in the form shown by Fig. 1, through the medium of mutilated gears 69 and 70. The crank 68 affixed to the gear 69 operates a lever 88 through the medium of a connecting rod 67. The feed pawls 73 are not operated directly by the lever 88 but are carried by a pair of depending levers 64, as shown by Fig. 14, which receive their motion through a lever 89. The lever 89 has laterally extending parallel flanges 90 in close relation to confronting flanges 91 on the lever 88. The fulcrum for the lever 88 is indicated at 92. The connection between the levers 88 and 89 is a cylindric member 93 at the upper end of a link 94. The lever 88 has a definite length of movement, but the length of movement imparted to the lever 89 depends upon the position of the connecting member 93 with relation to the fulcra of the two levers. The link 94 is lifted step by step and then dropped step by step so as to shift the connecting member 93 and thereby increase or decrease the extent of movement transmitted to the lever 89. The mechanism for thus varying the movement of the feed mechanism comprises a lever 95 to which the link 94 is connected, and a cam 96 driven by suitable gearing. The lever 95 as shown has for its fulcrum the stud upon which the mutilated gear 69 is mounted. The cam is so formed as to lift the lever 95 step by step and then permit the lever to descend step by step as the result of gravity and a spring $95^x$. Any suitable combination of gearing may be provided for driving the cam 96 at the necessary speed. The train of gearing illustrated receives its motion from the shaft 71 through a pinion 97, gear 98, pinion 99, and gear 100. This train of gearing reduces the speed of the cam shaft so that the cam shaft will have but one revolution for ten revolutions of the shaft 71. This ratio of gearing is correct for conditions which require ten stay members for each set of rods $x$, but the ratio of gearing will, of course, have to be varied according to the number of stay members required. Through the connections for oscillating the arms 64 the feed pawls 73 are operated so as to impart a differential feeding movement to the rods $x$ which are passing through the welding mechanism. The approaching rods $x$ which have not reached the welding mechanism receive their motion from feed rolls such as those previously indicated at 78 and driven by a connecting rod 79 having teeth 81 for oscillating a gear 80 loosely mounted upon the nearest shaft 77. The other shafts 77 are driven, as described, by sprocket wheels 86 and chains 87.

The feeding mechanism shown by Figs. 12 and 14 includes gearing for increasing the feeding movement to a greater extent than would be possible through the medium of the levers 88 and 89. This multiplying gearing is inactive for the most part but is rendered operative at the desired time by suitable controlling means such as a cam. The conditions which require a feeding step of unusual length will be understood by referring to Fig. 19, which illustrates a reinforcing unit for a concrete beam. For economy's sake, transverse stay members should be omitted for a considerable distance midway between the ends of the beam. For this reason the rods $x$ should receive an unusually long feeding movement in order to omit the said members near the middle portion of the beam. The mechanism for effecting this feeding movement of unusual length comprises back gearing including a small gear 101, large gear 102, and small gear 103. Gears 101 and 102 are affixed to a countershaft and are arranged thereon so that gear 101 engages gear 80 and gear 102 engages gear 103. Gear 103 is loose on the shaft 77. It is apparent from the foregoing that gear 103 will be rotated first in one direction and then in the opposite direction at relatively high speed by the action of the connecting rod 79. Affixed to the gear 103 is an arm 104 which carries a pawl 105. A ratchet wheel 106 is affixed upon the shaft 77 in position to be engaged by the pawl 105, and a spring 107 is attached to the arm so as to normally move the pawl into engagement with the ratchet. The pawl is for the greater part of the time positively held out of engagement with the ratchet by a circular disk 108 loosely mounted upon the shaft 77. One edge of the disk is beveled, as shown by Fig. 14, so that it may displace a finger 109 projecting from the pawl 105. When the finger rests upon the periphery of the circular disk, it is driven first in one direction and then in the opposite direction without effecting any result, since it is held out of engagement with the ratchet. The disk 108 is moved along the shaft 77 by a shipping lever 110 connected by a link 111 with a lever 112. The lever 112 is provided with a stud or cam roll which occupies the groove of a cam 113. This cam is affixed upon the shaft which carries the cam 96 and is therefore driven so as to receive one revolution while the feeding mechanism is feeding a set of rods $x$ a distance equal to the length of the rods. The groove in the cam 113 is so formed as to keep the pawl 105 out of engagement with its ratchet at all times excepting at one brief period in each revolution. This period occurs after one half of the stay members have been welded to the rods $x$. At this time the disk 108 is retracted out of engagement with the finger 109, whereupon the pawl is drawn into engagement with the ratchet 106. At this time the connecting rod 79 begins to move in the direction of feed and its movement, multiplied by the back gearing, is transmitted to the ratchet 106, thus driving the shaft 77 at a much higher rate of speed than the speed of the gear 80. The pawl 83 on the gear 80 is ineffective at this time because its ratchet 82, being fast to the shaft 77, is driven at the faster speed, while the pawl moves at the slower speed. In this way all the feed wheels 78 on the shaft 77 are driven at fast speed, thus advancing the rods $x$ with relation to the feed pawls 73. The movement of the feed pawls is therefore thrown away. The feed rolls 78 on all the other shafts 77 are simultaneously driven at the faster speed because the shafts are all connected so as to be driven in unison. At the completion of the long feeding movement, the disk 108 is restored to the position shown, thus throwing the back gearing out of connection and leaving the first shaft 77 to be driven as before by the pawl 83 and ratchet 82 instead of by the pawl 105 and ratchet 106.

The feed mechanism shown by Fig. 16 is another combination of differential feed mechanism and feed multiplying mechanism. The multiplying mechanism of Fig. 16 is not at any time thrown out of action nor is the differential feed mechanism thrown out of action. The feed pawls 73 in this form of mechanism are reciprocated by sliding rack bars 114 instead of levers such as those shown by Figs. 1 and 12. The rack bars are provided with teeth which engage large gears 115 affixed to a shaft 116. A small gear 117 affixed to the shaft is operated by a rack bar 118, one end of which is pivotally connected to a lever 119. The fulcrum of the lever 119 is indicated at 120. This lever receives its motion from a lever 121 whose fulcrum is indicated at 122. The relation of the levers 119 and 121 is substantially the same as the relation of the levers 88 and 89 shown in Fig. 12. The lever 119 is provided with laterally extending flanges 123, and lever 121 is provided with similar flanges 124. Driving connection between the levers is afforded by a cylindric member 125 at the upper end of the link 126. The lower end of the link is connected to a cam lever 127 pivoted at 128. The lever is provided with a roll which rests upon a cam 129 which is formed to lift the lever step by step and thereafter permit the lever to descend step by step. The lever 121 is operated by a connecting rod 130 which extends to a crank 131 on shaft 71. The crank in this instance is driven continuously instead of intermittently, and one half of each revolution of the machine is used for welding and the remaining part of the stroke for feeding strand rods. The work is conducted away from the machine by rolls 78$^x$.

The grinding mechanism is shown by Figs. 3, 4, 5, 13 and 15. There is one grinding wheel in line with each pair of welding jaws. The grinding wheels are indicated at 132, and their form is shown best by Fig. 5. Their peripheries are grooved at right angles and they are arranged so as to engage the two under faces of the rods $x$, since those are the faces which are engaged by the welding jaws. The upper faces of the rods $x$ are not engaged by the welding jaws, as illustrated by Fig. 18. The grinding wheels do not grind the entire length of the rods, but they grind only small portions of the rods slightly greater in length than the width of the welding jaws. The grinding wheels are driven continuously and are moved back and forth in an arc which is nearly tangent to the under faces of the rods $x$ but which is slightly intersected by said faces. Each grinding wheel is affixed upon a shaft 133. The shaft is mounted in bearings in a pair of arms 134 loosely mounted upon a transverse rod 135. The shaft 133 is provided with a pulley 136 adapted to be driven by a belt 137. Each grinding wheel is therefore driven by its own belt 137. The belts may all be driven by a drum 138, as shown by Fig. 13. The rod 135 extending transversely of the direction in which the rods $x$ are fed is mounted at its end in arms 139 and is keyed to said arms so that it cannot rotate. Between each pair of arms 134 is a bracket 140 splined to the rod 135. Each bracket is provided with an adjustable stop 141 and with a spring 142 arranged to exert its tension against the arms 134 to lift the grinding wheel. The arms 134, as shown by Figs. 4 and 5, are united by integral webs 143, one of which is adapted to abut against the stop 141 to limit the upward movement of the grinding wheel. The arms 139 are affixed to a rock shaft 144 mounted in suitable bearings in the frame members 84. One of the arms 139 is provided with an operating arm 145 by which connection is made with a rod 146. The rod is operated by a crank 147 affixed to the shaft 71 of the welding mechanism. As the crank revolves, the grinding wheels are oscillated about the axis of the shaft 144. As shown by the drawings, the grinding wheels are midway of the arc in which they oscillate, and in this position they engage the rods $x$. It will be observed that the arms 134 are out of engagement with the stops 141. This is due to the fact that the arms are depressed by the rods $x$ against the tension of the springs 142. The arc in which the grinding wheels move causes the wheels to engage the rods before the wheels reach their median position. The wheels thereafter move along the rods for a short distance, during which the arms 134 are retracted from the stops 141 and soon after engaged by the stops to retract the grinding wheels from the rods. The crank 147 is driven at such speed as to cause one rocking movement of the shaft 144 for each feeding movement of the rods. The desired tension is exerted upon the belts 137 by idle rolls 148 carried at the free ends of the arms 149. The arms are loosely mounted upon the rock shaft 144, each arm being arranged between a pair of arms 134 as shown by Fig. 5. The arms 149 are subject to the tension of springs such as that indicated at 150. These springs are coiled about the hubs of the arms 149 and are anchored to collars 151 pinned or otherwise affixed to the rock shaft. The idle rolls 148 are thus adapted to yield to the slackening or tightening of the belts 137, whether the lateral movement of the grinding wheels is a movement about the rod 135 or a movement about the shaft 144.

The location of the grinding mechanism with relation to the welding mechanism will depend upon the spacing of the transverse stay members. For example, the stay members are attached at equal intervals by the mechanism shown in Fig. 1. Assuming for the purpose of illustration that the feeding steps imparted by this mechanism are one foot in length, the grinding mechanism may be located at a distance of one foot or any number of feet from the welding jaws. In practice the distance will probably be three or four feet in order to keep the grinding mechanism apart from the welding mechanism. As shown by Figs. 13 and 15, the grinding wheels are at a relatively great distance from the welding jaws. The feed mechanism shown by Figs. 12 and 13 is designed especially for reinforcing units in which the transverse stay members are unequally spaced. In operating upon work of this character the grinding wheels must be located at a distance equal to the length of a reinforcing unit or a multiple thereof so that while the welding jaws are attaching a stay member to one reinforcing unit the grinding wheels may be operating upon the rods of another unit at a point corresponding to the point where the stay wire is being attached.

Figs. 21, 22 and 23 relate to manually operative feeding means adapted to be used for producing a reinforcing unit having stay members unequally spaced, as shown by Fig. 20. In Fig. 21 the line of weld is represented by the broken line 152, and the direction of feed is indicated by an arrow. The longitudinal rods $x$ are fed step by step by a push bar 153 adapted to abut against the rear ends of the rods. The push bar is provided with a supporting strip or flange 154 adapted to support the rear ends of the rods $x$. The ends of the pusher are provided with shoes 155 which are adapted to slide on guide rods or tracks 156. The rods $x$ are supported slightly in advance of the line of weld by grooved rolls 157 and are held on the tops of said rolls by pressure rolls 158. The rolls 157 are affixed to a shaft 157$^x$ whose ends are mounted in bearings in the standards 161.

The length of the feeding movements is determined by a series of stops 159 adjustably mounted upon a longitudinal bar 160. The ends of this bar are supported by standards 161, which standards serve also t support one of the guide rods 156. The other guide rod is supported by similar standards 161. The stops 159 are adapted to coöperate with a retractory stop pin 162 carried by the pusher 153. The construction of the stop members is better illustrated by Figs. 22 and 23. Each stop member 159 is adapted to be clamped to the bar 160 and is provided with a clamping screw 163 for the purpose. The stop pin 162 is mounted to slide longitudinally in a bracket 164 affixed to the pusher 153. A spring 165 contained in the bracket acts upon the stop pin in such a way as to normally project the outer end of the pin into a position wherein it is adapted to engage the stop members 159. The bar 160 is provided with a series of marks such as that indicated at 166, which marks may serve as an index for positioning the several stop members 159.

To use the feeding means above described, the stop members 159 are first clamped at the desired positions coinciding with the desired spacing of the successive stay members of a reinforcing unit. The desired number of longitudinal rods $x$ are then introduced between the grooved rolls 157 and pressure rolls 158, said rolls being adjustable laterally on their respective shafts to any desired positions. If rods $x$ of more than one length are to be incorporated into the same unit, the rear ends of the longer rods are placed upon the supporting bar 154 of the pusher. The shorter rods $x$ may be introduced between their rolls 157 and 158 when the longer rods have been fed forward the required distance. The longitudinal movement of the longer rods $x$ drives the rolls 157 upon which the rods are braced, thus driving also the gravity rolls which receive the shorter rods $x$. In this way the shorter rods receive feeding movement from the longer rods. After the first stay member $y$ has been welded and while the welding mechanism continues in operation, an attendant standing behind the pusher 153 may grasp the stop pin 162 and retract it against the tension of the spring 165, and at the same time step forward to advance the pusher. He will release the stop pin 162 so that it may engage the next stop member 159 and thus arrest the forward movement of the pusher at a predetermined point. By withdrawing the stop pin 162 after the finish of each feeding movement, and by advancing the pusher and permitting the stop pin to engage the stop members 159 in order, the whole number of rods $x$ will be advanced in unison through steps of predetermined length so that the stay members may be attached at the points desired.

It is obvious that the stop members 159 may be equally spaced and that the manually operative pusher may be used for feeding the longitudinal rods to produce a reinforcing unit in which the stay members are equally spaced as shown by Fig. 24. I have, however, provided other devices for determining the length of the feeding steps, to be used in lieu of the stop members 159 when the feeding steps are of equal length. The substitute stops for this purpose are shown by Figs. 25, 26 and 27. These stops are intended to be placed at the rear of the line of weld and to coöperate with each newly attached stay member $y$. The stops are mounted upon a transverse rod 167 whose ends may be affixed in brackets such as that indicated at 178. These brackets are adapted to be affixed to the frame of the welding mechanism. The stop members are arranged in series upon the rod, one of such members being illustrated alone by Fig. 27 and indicated at 168. These stop members are adapted to oscillate about the rod and are free to be moved laterally upon the rod so that they may be located at any desired lateral positions. The inclined face is provided to facilitate the forward movement of the stay member $y$, and the shoulder 170 presents an abutment against which the stay member may be drawn by movement opposite to feeding movement. The stop members are held with yielding tension in the position shown by Fig. 26. For this purpose the rod 167 is provided with positioning members 171, one of said members being provided for each stop member. The rod 167 is formed with a keyway 172 (see Fig. 26) and each member 171 is provided with a key 173 and with a screw 174 for pressing the key tightly against the rod to clamp the member 171 against lateral movement. Each member 171 is provided with an abutment 175 for engagement with the stop member 168, and is further provided with a finger 176 for supporting a spring 177 by which the stop member is normally held upwardly against the abutment 175. A pusher similar to that illustrated in Fig. 21 may be used for imparting feeding movement to the rods $x$. The stop members 168 are not used until after the first stay member $y$ has been welded to the longitudinal rods of a unit. Having attached the first stay member, one attendant may feed the unit by advancing the pusher a sufficient distance to carry the welded stay member beyond the shoulders 170. The stay member in passing over the stop members 168 depresses them by its action on the inclined faces 169. When the stay member has passed beyond the shoulders 170, the stop members snap upwardly against their abutments 175. An attendant at the rear of the welding mechanism may then push the stay member in the opposite direction until it abuts against the shoulders 170 as shown by Fig. 26. It will be understood that the brackets 178 which support the rod 167 are adjustable toward and from the line of weld so that the shoulders 170 may be located at any desired distance from the line of weld to give the desired spacing between the stay members. The second stay member and each successive stay member thereafter is welded while the preceding stay member lies against the shoulders 170. This form of mechanism for positioning the unit with relation to the welding mechanism, and the stop mechanism shown by Figs. 21 to 23, is adapted to perform its function while the welding mechanism continues in operation.

I claim:

1. A machine for making welded fabric, comprising in combination, two feeding means arranged in tandem relation to act respectively upon the unfabricated portions of the strand members and upon the fabric, and welding means arranged to weld stay members to the strand members between said two feeding means.

2. A machine for making welded fabric, comprising in combination, two feeding means arranged in tandem relation to act respectively upon the strand members and upon the stay members of the fabric, and welding means arranged to weld stay members to the strand members between said two feeding means.

3. A machine for making welded fabric, comprising means for supporting a plurality of rods, means for placing metallic members across said rods in contact therewith, means for electrically welding said rods and cross members at their points of intersection, reciprocatory means for engaging the welded cross members to feed the work step by step, and driven means for varying the relation of the elements of said feeding means whereby the length of feeding steps is varied.

4. A machine for making welded fabric, comprising means for imparting step-by-step feeding movement to the work, and welding means arranged to weld the fabric members to each other, said feeding means having provisions for automatically varying the length of the feeding steps of the fabric.

5. A machine for making welded fabric, comprising electric welding mechanism, means for feeding rods thereto, means for placing metallic members across said rods in position to be welded, and means in advance of the welding mechanism for grinding said rods at the points which are to be engaged by said welding mechanism.

6. A machine for making welded fabric, comprising welding means, feed rolls arranged to act on the strand members, and means for driving said rolls step by step, said driving means having provisions for automatically varying the length of steps imparted to said rolls.

7. A machine for making welded fabric, comprising means for feeding rods square in cross section, means for placing metallic stay members across said rods, and means for electrically welding said rods and stay members at their points of intersection, said feeding means being adapted to position said rods so that their edges or angles will be presented to said stay members.

8. A machine for making welded fabric, comprising reciprocatory feeding members arranged to act upon the welded stay members to feed the fabric lengthwise, and means for operating said feeding members to impart reciprocatory feeding movement thereto, said means having provisions for automatically varying the length of feeding movement of said members.

9. A machine for making welded fabric, comprising electric welding mechanism, means for supporting straight rods, means for placing metallic members across said rods in position to be welded, and means in advance of the welding mechanism for grinding said rods at the points which are to be engaged by said welding mechanism.

10. A machine for making welded fabric, comprising means for supporting rods, a magazine for metallic stay members, means for separating said stay members one at a time from the others in the magazine, means for transferring the separated stay member to said rods so as to extend across the same, and welding mechanism for welding said rods and stay member at their point of intersection.

11. A machine for making welded fabric, comprising means for supporting rods square in cross section, means for placing metallic stay members across said rods, and means for electrically welding said rods and stay members at their points of intersection, said supporting means being adapted to position said rods so that their edges or angles will be presented to said stay members.

12. A machine for making welded fabric, comprising abrading means for cleaning the fabric members, welding means, and means for feeding the fabric members from said abrading means to said welding means.

13. A machine for making welded fabric, comprising welding means adapted to grasp and weld a fabric member of square cross section and a fabric member extending across the same, and means for holding the square member so that one of its longitudinal edges is foremost toward the other fabric member.

14. A machine for making welded fabric, comprising welding means adapted to grasp and weld a fabric member having a longitudinal edge and a fabric member arranged across the same, and means for holding the first-named fabric member so that said edge will be foremost toward said other fabric member.

15. A machine for making welded fabric, comprising welding means for grasping and welding strand members and stay members, and means for engaging strand members of square cross section to feed the same to said welding means, said feeding means being formed and arranged to keep one longitudinal edge of each strand member foremost toward said stay members.

16. A machine for making welded fabric, comprising means for supporting strand members of square cross section in substantially horizontal position, said means being adapted to position said strand members so that a longitudinal edge of each will be uppermost, and welding means adapted to grasp and weld said strand members and a stay member arranged thereon.

17. A machine for making welded fabric, comprising welding means adapted to grasp and weld strand members of square cross section and a stay member, and means for feeding strand members of square cross section to said welding means, said feeding means being arranged to feed said strand members substantially horizontally and keep them so that a longitudinal edge of each will be uppermost.

18. A machine for making welded fabric, comprising means for welding strand members and stay members to each other, a magazine for stay members, said magazine having an outlet arranged to discharge a stay member above the strand members and in vertical alinement with the path of the strand members as a whole, and means for positioning the stay member for welding.

19. A machine for making welded fabric, comprising means for welding strand members and stay members to each other, a magazine for stay members, means movable from said magazine to said welding means for transferring the stay members one by one from the magazine to the welding means, and means for feeding the stay members in said magazine one by one to said transferring means.

20. A machine for making fabric, comprising means for welding strand members and stay members to each other, a series of stay-member holders, means for supporting said holders, and means for transferring stay members laterally from said holders to the strand members for welding, said holders being adjustable laterally to suit the length of said stay members and to determine their endwise position.

21. A machine for making welded fabric, comprising means for welding strand members and stay members to each other, a magazine for stay members, and means for transferring a stay member laterally from said magazine to welding position, said magazine being adjustable to determine the endwise position of the stay members in the fabric.

22. A machine for making welded fabric, comprising means for welding strand members and stay members to each other, means for supporting the strand members in a substantially horizontal position, manually movable means for feeding said strand members, and a series of stops for arresting the feeding movement of said feeding means at a series of predetermined points, said feeding means having provision for coacting with said stops successively for the purpose specified.

23. A machine for making welded fabric, comprising means for welding strand members and stay members to each other, means for supporting the strand members in a substantially horizontal position, manually movable means for feeding said strand members, a series of stops for arresting the feeding movement of said feeding means at a series of predetermined points, and a device movably mounted on said feeding means for coacting with said stops successively for the purpose specified, said device being movable from stop-engaging position to permit further feeding movement of said feeding means.

In testimony whereof I have affixed my signature, in presence of two witnesses.

WILLIAM S. SOUTHWICK.

Witnesses:
W. P. ABELL,
P. W. PEZZETTI.